(No Model.) 2 Sheets—Sheet 1.
F. H. BARNETT.
CORN SHELLER.
No. 462,108. Patented Oct. 27, 1891.
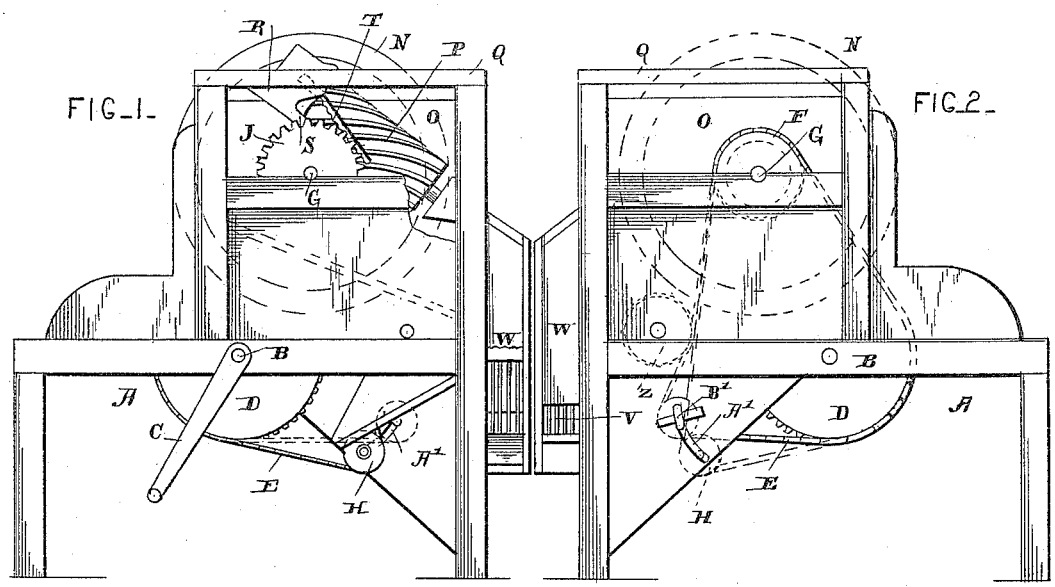
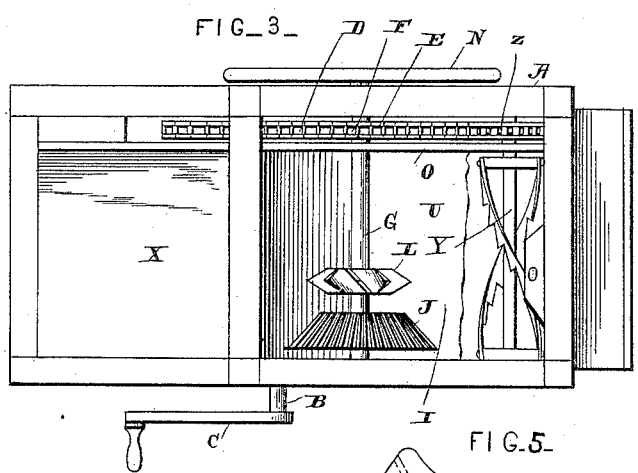
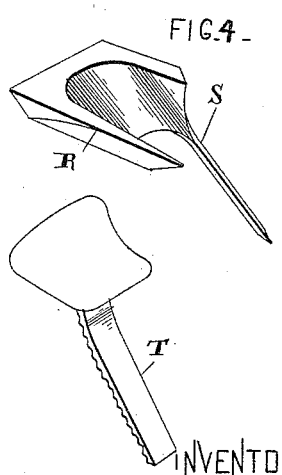
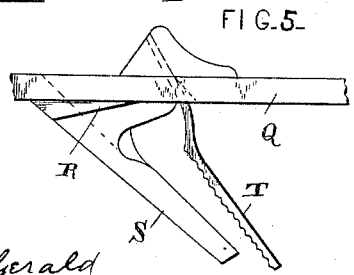
WITNESSES
Geo. E. Frech.
Roland A. Fitzgerald
INVENTOR
Frank H. Barnett
per Lehmann & Pattison
Attys (No Model.) 2 Sheets—Sheet 2.
F. H. BARNETT.
CORN SHELLER.
No. 462,108. Patented Oct. 27, 1891.
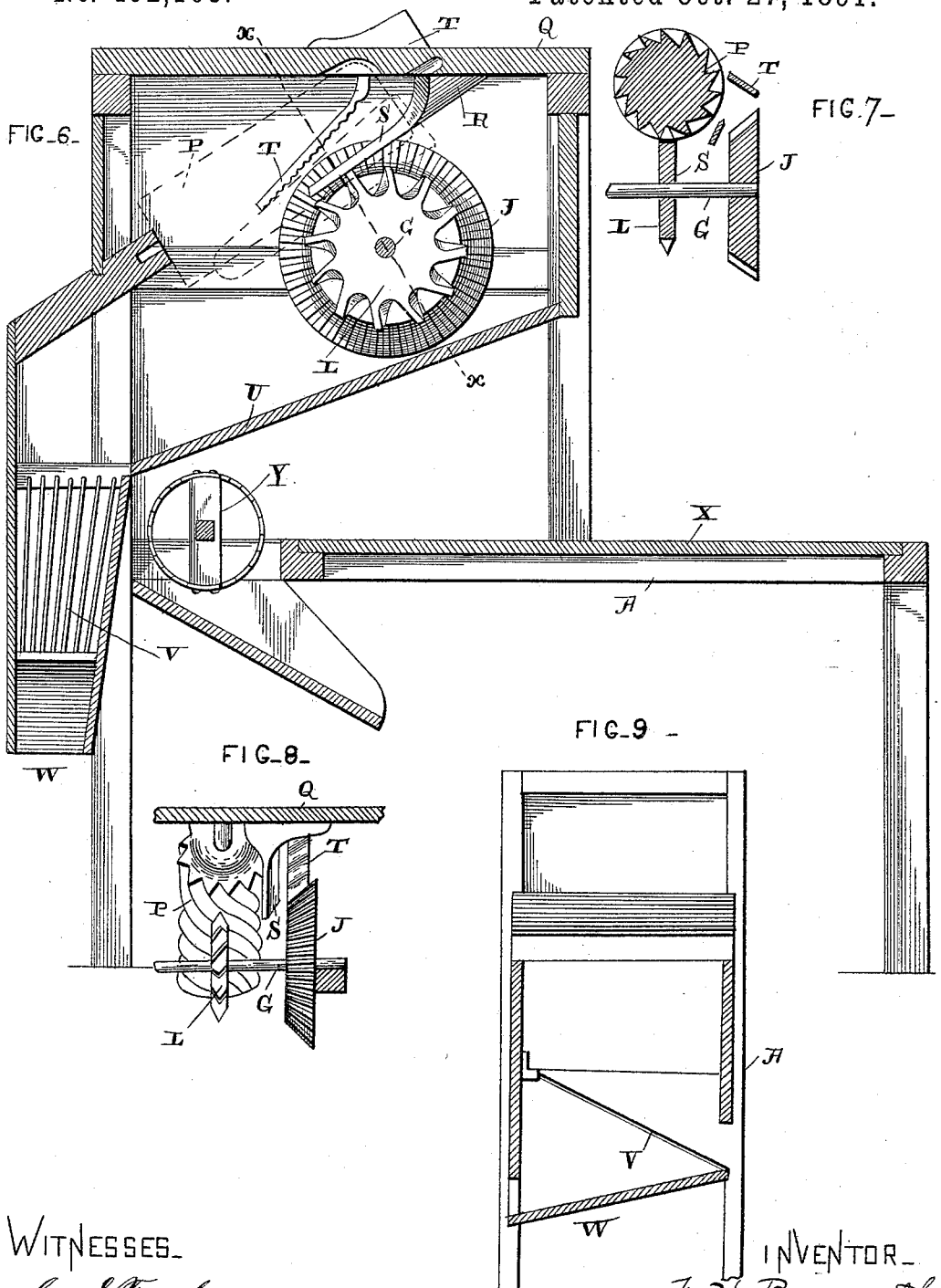

UNITED STATES PATENT OFFICE.

FRANK HAYNES BARNETT, OF HUBBARD, NEBRASKA.

CORN-SHELLER.

SPECIFICATION forming part of Letters Patent No. 462,108, dated October 27, 1891.

Application filed April 29, 1891. Serial No. 390,946. (No model.)

*To all whom it may concern:*

Be it known that I, FRANK HAYNES BARNETT, of Hubbard, in the county of Dakota and State of Nebraska, have invented certain new and useful Improvements in Corn-Shellers; and I do hereby declare the following to be a full, clear, and exact description of the invention, such as will enable others skilled in the art to which it pertains to make and use it, reference being had to the accompanying drawings, which form part of this specification.

My invention relates to an improvement in corn-shellers; and it consists in the combination and arrangement of parts, which will be fully described hereinafter, and more particularly referred to in the annexed claims.

The objects of my invention are to provide a mechanism whereby ears of corn can be quickly and readily shelled with the expenditure of but a very small amount of power.

Figures 1 and 2 are side elevations taken from opposite sides of the machine, portions of the frame being removed so as to show all of the operating parts. Fig. 3 is a plan view with the cover removed. Fig. 4 is a detail view of the casting and spring. Fig. 5 is an elevation of the parts illustrated in Fig. 4, showing their relative positions. Fig. 6 is a vertical sectional view of my improved sheller. Fig. 7 is a sectional view on the line $x\,x$ of Fig. 6. Fig. 8 is a view from the interior of the machine, showing the position of the shelling parts. Fig. 9 is a rear view of the machine shown partly in section.

A represents a frame-work of any suitable construction, and in which is journaled the operating-shaft B, which is provided with the crank C at one end and a large sprocket-wheel D at the other. Passing around this sprocket-wheel D is a sprocket-chain E, which extends up over the sprocket-pinion F on the shaft G and around the adjustable spool or pulley H. The shaft G extends horizontally through the corn-shelling chamber I and has secured to it a wheel J, which serves to force the corn on through a smaller wheel L, which has its teeth set at an angle, the sprocket wheel or pinion F, and the large fly-wheel N. Inside of the chamber I, which need only be large enough to hold the two wheels J L and the revolving cylinder and to allow the ears of corn to pass freely through, is placed a partition O, which serves to prevent the escape of the corn through the opening which is made for the sprocket-chain where it passes up over the pinion F. The wheel J is shaped like a beveled pinion, and it serves not only to assist in shelling the corn from the ear, but in forcing the ear on through the chamber. The only office of the wheel L having its teeth set at an angle is to cause the fluted cylinder P to revolve. This cylinder extends diagonally through the chamber I and has the teeth of the wheel L, over which it extends, to engage with its flutes, and thus cause it to revolve for the purpose of assisting in shelling the ear of corn at the same time that it causes the ear to revolve, so that every grain will be shelled from the cob. The lower bearing for this cylinder is formed upon the frame A and the upper one is formed in the under side of the cover Q. Through the cover Q is formed an opening, through which the ear of corn is passed into the box or chamber I, and secured to the under side of this lid is a casting R, which extends diagonally under the opening, and which casting has a projection S, which has a sharpened edge and which projection extends between the cylinder P and the wheel J and against which the ear of corn is made to bear by the spring T, having a corrugated lower surface. This spring exerts a downward pressure upon the ear of corn and forces it against the projection S, the cylinder, and the wheel J, so that all three will act at the same time upon the ear of corn for the purpose of shelling it. The cylinder P and wheel J, when the ear passes in between them, the points upon the wheel, and the ridges on the cylinder, not only take all the corn off the cob as the ear whirls around, but the grooves are placed at such an angle around the cylinder that they assist the wheel J in carrying the corn-ears through. This assistance on the part of the cylinder enables the ear to be forced through quickly and the corn to be shelled off very rapidly. The extension S prevents the cylinder from wedging or grinding the corn through between itself and the wheel, and by having a sharp edge the corn is pressed against it with a whirling motion, caused by the cylinder and wheel, thus shelling all the corn off that comes in contact with the extension.

This extension also serves a purpose similar to the spring, only that it does not press upon the corn as the spring does, but assists in separating the corn from the cob when it is pressed down against the sharp edge of the extension by the spring.

The bottom U of the chamber I, which also forms the top of the feed-box, is placed upon an incline, so that the shelled corn and cobs pass on out from the chamber I and fall upon the inclined wires V, placed in the box-like extension W upon the end of the frame. The cobs slide down the inclined wires out of the frame, while the corn drops through the wire and falls out at the opposite end of the box.

Upon the inner end of the shaft Y' is placed a sprocket-wheel Z, with which the sprocket-chain engages when the roller H is moved upward in the curved slot A' as far as its bearing B' will admit. This bearing B' slides back and forth in the slot and the roller H moves the sprocket-chain so that it will engage with the wheel Z or not, as may be desired.

The above-described construction may be employed for simply tightening the belt or drive-chain E when it becomes loose, or knives may be placed on the shaft Y for cutting straw, &c. When the knives are applied to the said shaft, it is evident that the same may be revolved while the corn is being shelled, or by moving the roller H with its frame downward in the slot A' that the chain or belt will disengage the wheel Z, thus throwing the latter out of operation.

Having thus described my invention, I claim—

1. In a corn-sheller, a fluted or grooved cylinder arranged diagonally, a wheel for causing the cylinder to revolve, and a wheel for both forcing the ear on through the chamber and to assist in shelling it, substantially as described.

2. In a corn-sheller, the frame, the horizontal shaft journaled therein, wheels J L, mounted on the shaft, the spirally-grooved cylinder which is revolved by the wheel L, projection S, having a sharpened upper edge, and projection T, formed with a serrated lower side, the parts being combined substantially as shown and described.

3. In a corn-sheller, the frame, a revolving grooved or fluted cylinder journaled diagonally therein, a shaft, a wheel mounted on said shaft which engages the cylinder, a shelling-wheel, also secured to said shaft and between which and cylinder the ear passes while being shelled, projection S, which extends in a line with the revolving cylinder, and pressure-spring T, the parts being combined to operate substantially as shown and described.

4. In a corn-sheller, the frame, a horizontal shaft journaled therein, a wheel mounted on said shaft, provided with diagonal beveled peripheral projections, a cylinder in the frame provided with spiral grooves which are engaged by the said wheel, shelling-wheel J, projection S, against which the lower edge of the ear bears while being shelled, and spring T, which bears upon the ear, the parts being combined substantially as shown and described.

5. In a machine of the character described, the shafts B, G, and Y, wheels mounted on the said shafts, a belt connecting the said wheels, a frame provided with an arc-shaped slot, a projecting portion adapted to move in the slot, and a wheel secured to the said projection, around which passes the said belt, whereby the belt is brought in and out of contact with the wheel on the shaft Y by the adjustment of the wheel-carrying frame in the said slot, the parts being combined substantially as shown and described.

In testimony whereof I affix my signature in presence of two witnesses.

FRANK HAYNES BARNETT.

Witnesses:
J. C. DUGGAN,
J. F. DUGGAN.